INVENTORS
HARRY L. RICH
BY EDWARD T. HABIB

B. L. Zangwill
ATTORNEYS

April 7, 1959     H. L. RICH ET AL     2,881,043
SHOCK-SPECTRUM INSTRUMENT
Filed Dec. 6, 1954     3 Sheets-Sheet 2
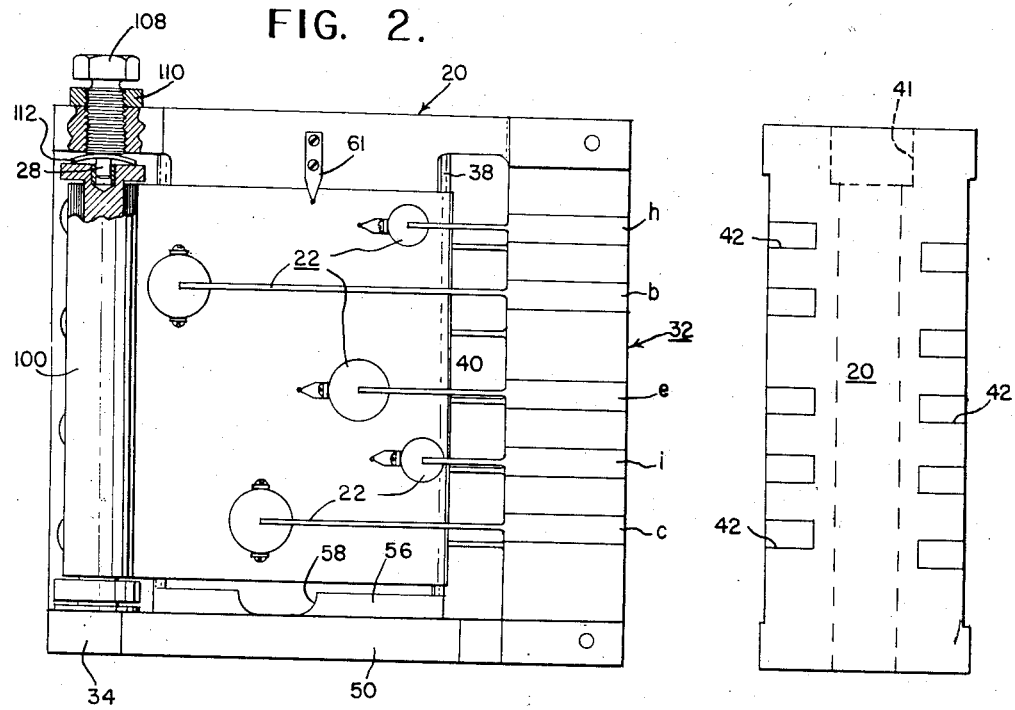
FIG. 2.
FIG. 6.
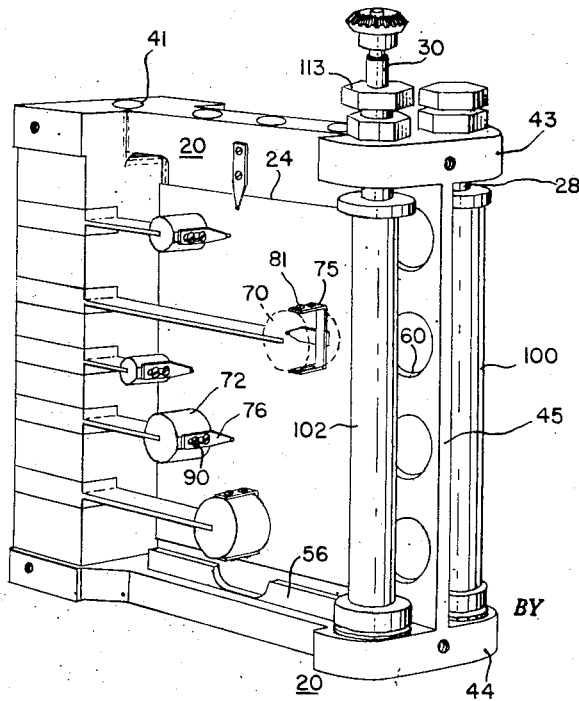
FIG. 3.
INVENTORS
HARRY L. RICH
EDWARD T. HABIB
BY B. L. Zangwill
ATTORNEYS April 7, 1959  H. L. RICH ET AL  2,881,043
SHOCK-SPECTRUM INSTRUMENT
Filed Dec. 6, 1954  3 Sheets-Sheet 3

INVENTORS
HARRY L. RICH
BY  EDWARD T. HABIB

B. L. Zangwill
ATTORNEYS

United States Patent Office 2,881,043
Patented Apr. 7, 1959

2,881,043

SHOCK-SPECTRUM INSTRUMENT

Harry L. Rich, Takoma Park, and Edward T. Habib, Silver Spring, Md., assignors to the United States of America as represented by the Secretary of the Navy Application December 6, 1954, Serial No. 473,492

6 Claims. (Cl. 346—7)

(Granted under Title 35, U. S. Code (1952), sec. 266)

The invention described herein may be manufactured and used by or for the Government of the United States of America for governmental purposes without the payment of any royalties thereon or therefor.

This invention relates to improved means for obtaining a spectrum of the motion of a piece of equipment when it is subjected to shock; by shock meaning an impact of short duration in the order of 1,000th of a second to one second, more or less.

The problem of analyzing the effects of shock on equipment is complicated by the transient nature of the shock excitation. One method of approach is to analyze the effects of shock in terms of the responses that the shock produces on a series of cantilever reeds, each having a natural frequency different from those of the other reeds. A collective plot of the displacements of the reeds or of quantities mathematically related thereto against the frequencies of the several reeds is known as a shock spectrum. Knowledge of a shock spectrum is useful for many purposes, such as for example, in the design of machines and other equipment to withstand shocks; in the comparison of the cushioning properties of various packing materials and methods; in noise reduction of equipment; and in ascertaining satisfactory characteristics of shock mountings. Devices of the prior art for obtaining a shock spectra are cumbersome or erratic in that they provide indications that are not the same under duplicated shock conditions. With some devices, inordinate periods of time and tedious calculations or analyses are required in order to get the desired results.

The present invention has for its primary object the provision of a single instrument that provides consistent or repetitive shock spectra under duplicated conditions of shock on equipment.

Another object of the invention is to provide a shock spectrum instrument by means of which an indication or a record, or both, of a shock spectrum of shocked equipment can be quickly and economically obtained.

A further object of the invention is to provide a device of the type described which is essentially mechanical in construction, which is inexpensive to build, which is light, compact, sturdy and reliable, and which requires little skill to operate.

A shock instrument in the nature of the invention comprises an integral main frame, a plurality of weighted reeds of known resonant frequencies mounted on the frame as cantilevers, a chart on which displacements of the reeds by shock can be noted or recorded by scribers on the reeds, and a drive means comprising a motor for slowly moving the chart past the scribers to cause the scribers to mark the chart with a time-plot of the reed-vibrations. However, when amplitude indications alone are desired, the motor can remain inoperative or may be omitted entirely. When the chart is moving, the instrument can be used to obtain a measure of the time between rapidly following shocks, as well as the relative intensities, nature and lengths of the several shocks.

Additional features of the instrument comprise a light but extremely stiff main frame, a rigid interconnection between the main frame and the reeds, a large spread between fundamental and second harmonic frequencies of each reed, adjustability for minimizing of scriber friction, replaceability of certain operating parts, light total weight, and other distinguishing features.

A construction in accordance with the invention provides an instrument in which spurious vibrations and displacements are negligible, and indications are reliable rather than erratic. In other words, the shock-motion produced in the equipment subjected to a shock is faithfully represented by the instrument; the instrument being exceptionally accurate and yielding duplicate results under duplicate shock conditions.

Other objects and many of the attendant advantages of this invention will be readily appreciated as the same becomes better understood by reference to the following detailed description when considered in connection with the accompanying drawings. The figures of the drawings are essentially to scale but the different figures are not necessarily to the same scale. In the drawings;

Fig. 2 is a back elevational view of the embodiment, with some parts in section and some parts omitted for clarity;

Fig. 3 is a perspective view of the embodiment with certain parts omitted for clarity;

Fig. 6 is a back view of the main frame of the embodiment;

Figure 1:
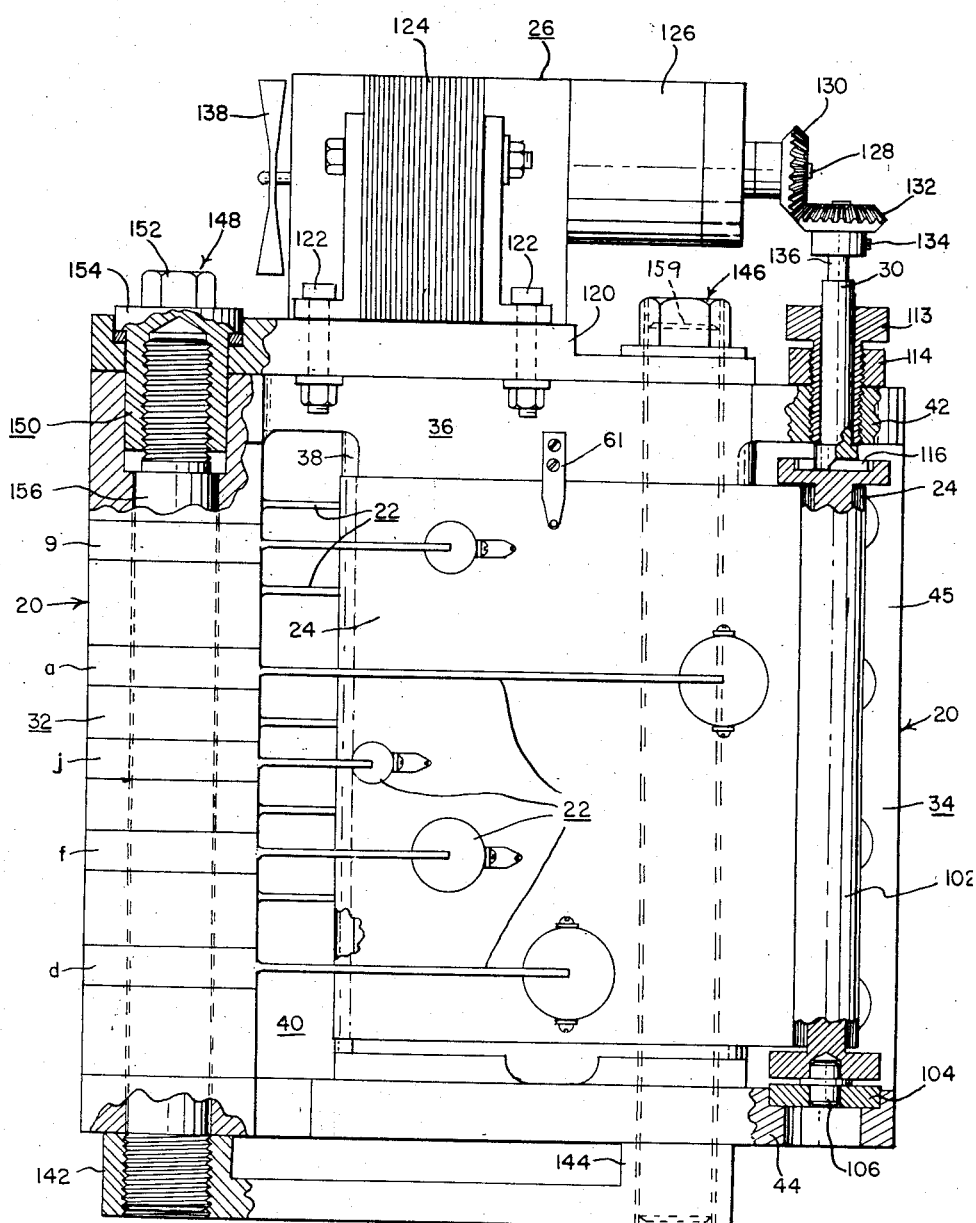
Fig. 1 is a front elevational view, with some parts in section, of a preferred embodiment of a shock-spectrum instrument embodying principles of the invention.

An instrument in accordance with the invention comprises a specially designed main frame 20 which carries the remaining essential parts of the instrument, these parts comprising a response-analyzing means and a response recording means comprising a chart and a driving means.

The response-analyzing means indicated in its entirety by the reference numeral 22, comprises a plurality of differently-resonant, weighted reeds, a through j, each reed being designed to have a particular natural frequency.

The recording means is provided for recording and indicating the nature of the motion of the reeds. The recording means comprises a waxed-paper chart 24 and equipment for driving the chart, this equipment being designated as a driving means 26 (Fig. 1). The driving means is mounted on the top of the main frame 20. The recording means also comprises roll-means on which the chart 24 is wrapped and unwrapped. This roll-means comprises means for receiving and positioning a new roll of chart 24 and means for wrapping up chart on a spool as the chart is unrolled from the new roll. The last two means comprise a roll-holding stub guide shaft 28 and a driving shaft 30, respectively. Any suitable mounting construction that permits the rolls of chart to be readily replaced can be used, one form being shown in Figs. 1 and 2. It is, however, preferred that snug fits be used to minimize undesired relative movement.

Figure 4:
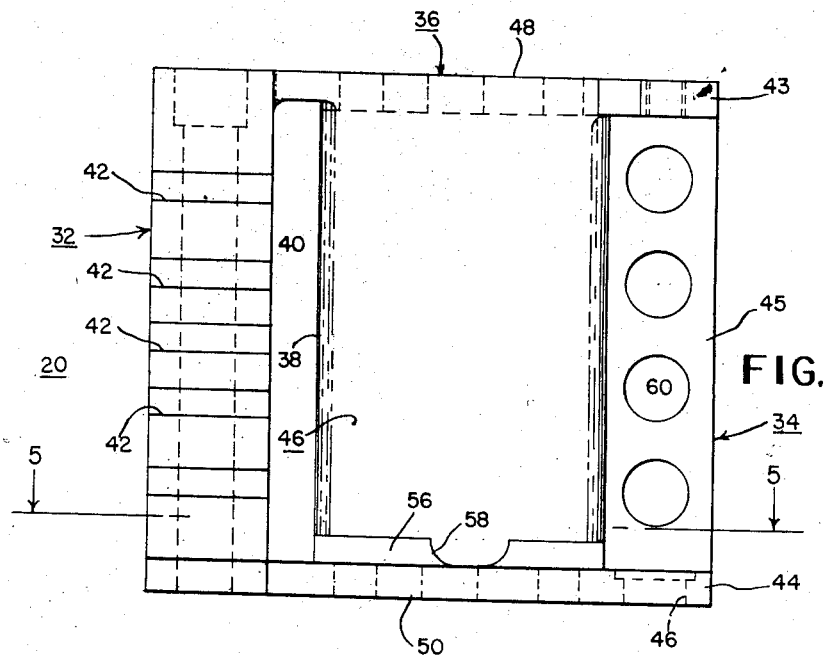
Fig. 4 is a vertical front view of the main frame, per se, of the embodiment.
Figure 5:
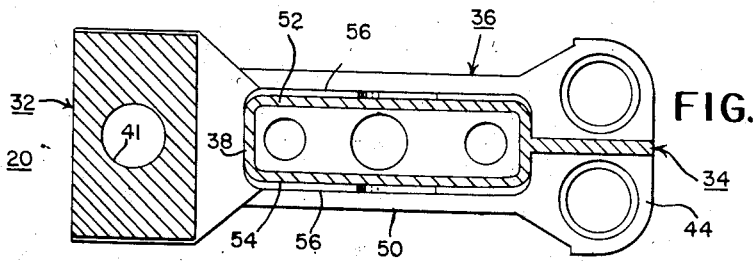
Fig. 5 is a sectional view taken substantially on the line 5—5 of Fig. 4.

The main frame 20 is a single-piece aluminum casting which is machined, where necessary, to the shape shown in the drawings and especially Figs. 4, 5 and 6. The main frame 20 comprises a reed-carrying side-portion 32, an opposite shaft-carrying side-portion 34 and a platen-providing central portion 36. On one side the central portion 36 merges into the side portion 34, and on the other side the central portion 36 has an edge 38 spaced from the side portion 32, thereby providing a rectangular open space 40 in the main frame. While the main frame 20 has been divided, arbitrarily, into portions 32, 34 and 36 for convenience of description, it is to be understood that the main frame is one integral piece.

The side-portion 32 of the main frame 20 is substantially a solid-prism except for a vertical through-hole 41 extending centrally therethrough, and except for a plurality of spaced parallel slots 42 on the front and the back sides of the side portion 32 for receiving the various reeds. The slots 42 are carefully machined to size; and each slot 42 extends completely across the side portion 32. The vertical arrangement of the slots 42 on each side of the side portion 32 is determined by the swing of the reed associated therewith; the arrangement being chosen to give a minimum height of main frame.

The other side portion 34 of the main frame 20 comprises upper and lower horizontal plate-like sections 43, 44, respectively, and a comparatively much thinner vertical plate-member 45 merging into the facing or inner faces of the plate-like sections 43 and 44. Each of the sections 43 and 44 is provided with a pair of holes, one on each side of the member 45. These holes suitably support the roll means for the chart in a manner subsequently described.

The central portion 36 of the main frame 20 is in the form of a flat hollow tube or platen 46 merging into a top member 48 and a bottom member 50 of the central portion. These members 48 and 50 have vertically aligned holes for casting purposes and so that a hold-down bolt can be passed through them and through the hollow of the platen 46. The platen 46 of the central portion 36 has a pair of flat, vertical, parallel outer faces 52 and 54 which are joined by the edge 38 at one side, and by edges merging into plate member 45 of the side portion 34 on the other side. Preferably the platen faces 52 and 54 and the outside of the edge 38 are smooth finished and the corners of the edge 38 are rounded so as to provide a smooth overall surface for the chart 24 to slide on.

The sides of the top and bottom members 48 and 50 of the central portion 36 merge directly into the tops and bottoms of the side portions 32 and 34 of the main frame 20, providing flat top and bottom faces completely across the main frame 20. The upper member 48 of the central portion 36 is the same width as the platen 46; but the lower member 50 is of greater width than the platen. This added width gives it desired greater strength. A narrow reinforcement 56 is also provided on each side of the lower part of the platen 46. Each reinforcement 56 has an indentation 58 to permit wider swing of the nearest reed. Where strength is not needed holes can be provided in the main frame 20 for decreasing the weight of the instrument. To this end, for example, a plurality of holes 60 are provided in the plate-section 45.

An indication of the size of the main frame of a practicable instrument is obtainable from the fact that in the preferred embodiment shown in Fig. 4, the frame has a maximum horizontal dimension of eight and seven-eighths inches inclusive.

Reference markers 61 are screwed to the central portion 36 and may be provided with a scriber for marking a reference line on the chart 24.

Figure 7:
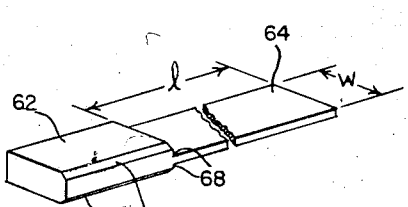
Fig. 7 is a perspective view of one of the reeds of the embodiment.

The reeds of the preferred embodiment are identified in Figs. 1 and 2 by the letters $a$ through $j$. Each reed is carried in an associated slot 42 of the main frame 20 and is made of weighting means and a single piece of spring steel, SAE 6150 being satisfactory. As shown in Fig. 7, each single piece of spring steel consists of a butt 62 and a vibratory blade 64. The butts of all of the reeds are structurally essentially the same as are the widths, $w$, but the weighting means and the lengths and thicknesses of the blades vary in accordance with the frequencies desired for the particular reeds. The chart below indicates the lengths, $l$, and the thicknesses, $t$, of the blades for the various frequencies of reeds used in the preferred embodiment.

| Reed | Frequency, cycles per second | Length, $l$, inches | Thickness, $t$, inches |
|---|---|---|---|
| $a$ | 20 | 6.88 | 0.0602 |
| $b$ | 28.3 | 6.88 | 0.0762 |
| $c$ | 40 | 5.58 | 0.0705 |
| $d$ | 56.7 | 5.23 | 0.0795 |
| $e$ | 80 | 4.08 | 0.0605 |
| $f$ | 113.4 | 3.88 | 0.0605 |
| $g$ | 160 | 3.88 | 0.0625 |
| $h$ | 227 | 3.38 | 0.0625 |
| $i$ | 320 | 3.08 | 0.0625 |
| $j$ | 454 | 3.08 | 0.0625 |

The spring steel pieces for the reeds are carefully machined and ground with the length dimension held to plus and minus .01 inch tolerance, and the thickness of the blade held to plus or minus .0005 inch tolerance. The thickness of each butt is seven-sixteenths of an inch and is matched to the associated slot 42 so that it is 0.0012″ oversize with a tolerance of minus zero plus .0003 inch at room temperature.

Each of the butts is generally a solid rectangular prism but is provided with a pair of beveled edges 66 so that it can be better placed in the associated slot 42 of the main frame 20. The edges 66 extend for the full length of the butt. This slightly beveled side of each reed is the entering edge for the reed when it is placed into an associated slot 42. Fillets 68 are provided at the points where the blade 64 merges into the butt 62.

Preferably the reed-pieces are made in accordance with the following steps:

(1) Bar stock is cut off to lengths slightly more than the desired lengths, and each piece of stock is heated to about 1600° F. and held thereat for one-half hour.

(2) The heated stock is then air-cooled to room temperature.

(3) The cooled stock is then tempered at 1300° F. for two hours.

(4) The stock is then cooled to room temperature and rough machined.

(5) After rough machining the rough form is slowly heated to 1550° F. and held thereat for about five minutes, thereafter being quenched in agitated oil at room temperature.

(6) The quenched rough machine stock is then tempered at 400° F. for one hour.

(7) The tempered rough-machined bar stock is air-cooled to room temperature.

(8) It is then retempered at 400° F. for one hour and air-cooled.

(9) After the above treatment, the bar stock is finished by grinding. All grinding is done with very light cuts and a maximum of coolant is used.

The foregoing heat treatment imparts the necessary hardness and yield strength to the steel. For example, the heat treatment described should produce a yield strength of approximately 200,000 pounds per square inch.

Figures 8, 10:
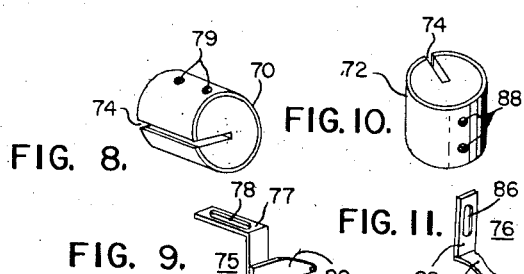
Fig. 8 is a perspective view of a weighting means or mass for a longer reed of the embodiment.
Fig. 10 is a perspective view of a weighting means or mass for a shorter reed of the embodiment.
Figures 9, 11:
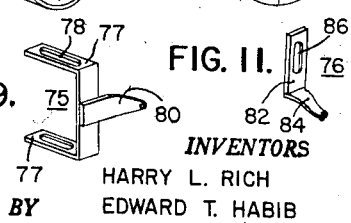
Fig. 9 is a perspective view of a scriber element that is secured to the weighing means of Fig. 8.
Fig. 11 is a perspective view of a scriber for the weighting means of Fig. 10.

A separate weighting means is used for each reed. Two forms are provided. The form of weighting means 70, shown in Figs. 8 and 9, is used with reeds $a$, $b$, $c$ and $d$; and the form of weighting means 72, shown in Figs.

10 and 11, is used with the remaining reeds. Each weighting means comprises a brass cup of appropriate size that is filled with lead. Each weighting means has a slot 74 that fits the end of the associated blade 64 of the reed, and is soft soldered thereto.

The weighting means 70 is provided with a scriber 75 for marking the chart 24 through pressure action; and the weighting means 72 is provided with a scriber 76 for a similar purpose.

The scriber 75 has a U-shaped securing portion with legs 77, each leg having an elongated slot 78 that can be aligned with a pair of screw holes 79 on each side of the weighting means 70. The screw holes 79 lie in a plane perpendicular to the plane of the slot 74 of the weighting means. Screws 81 hold the scriber 75 to its associated weighting means 70. Each scriber 75 also has a flexible scribing element 80 that terminates in a pressure point that bears on the chart 24.

Each scriber 76 for the lighter weighting means 72 is angular shaped, having a single leg 82 and a flexible scribing element 84 having a pressure point. The legs 82 are also provided with an elongated slot 86 which can be aligned with a pair of screw holes 88 in a side of the weighting means 70. The pair of screw holes 88 lie in the same plane as the slot 74 of the weighting means 72. Screws 90 secure the scriber 76 to its associated weighting means 72.

It has been found desirable to provide an adjustable mounting of the scribers 75 and 76 on the weighting means so that the pressure with which the scribing points press on the chart 24 is controllable. It is desirable to make this pressure as light as possible because scriber friction is important in obtaining reproducible indications. In the described construction the friction between a scriber and the chart can be minimized by adjusting the position of the scriber on its associated mass, so that the displacements indicated on the chart will more accurately reflect the response to shock-motion. For further limiting friction between the scribers and the chart, the platen 46 is made stiff, hard, and ground smooth. Stiffness is imparted by using a tubular structure which merges into top and bottom portions of the main frame 20 that extend across the full length of the main frame 20. Additionally the end of the platen 46 merges into the reinforcing and stiffening plate 45 which also merges into the top and bottom portions of the main frame. The blade portions of the reeds should be quite stiff, so that the friction force of the scribers is made a smaller fraction of the total force necessary to move the scribe through a given displacement.

A further feature that permits an improved joint between the reeds and main frame is the thick butts on the reeds. The reeds are forced into the slots 42 of the main frame 20, the butts 62 of the reeds being deliberately made somewhat wider than the slots, as previously described. In the preferred form of instrument described, the reeds were cooled in a deep freeze to −200° F. and the main frame heated to +300° F. Assembly was then made in a hand press, and after assembly the entire unit was permitted to cool to room temperature. A reed with a thickened butt can be clamped more rigidly as compared to one having its butt and blade of the same thickness. It is difficult to bend a thick butt so that noticeable vibration is confined substantially entirely to the blade portion of each reed. This design also eliminates clamping of the reeds by a joint which might be less efficient, such as for example, bolting which would introduce spurious vibrations or would not faithfully transmit the shock motion of the main frame to the reeds.

The invention contemplates an increase in the ratio of the end mass (the weighting means at the end of a blade) to the mass of the blade itself. The weights of the masses for the weighted reeds a, b, c, d, e, f, g, h, i and j are, respectively 0.23, 0.23, 0.23, 0.23, 0.17, 0.11, 0.059, 0.072, 0.071, and 0.034, the weights being in pounds.

As a result of this construction each reed corresponds more closely to an ideal simple mechanical system; and the difference between the undesirable second mode frequency and the first mode frequency (the fundamental frequency desired to be recorded) is increased. The noxious effect of second mode vibration on recorded indications is especially important on the low frequency reeds a, b, c and d; and the effect on these reeds is further decreased by placing the scribing point at the node of the second mode vibration. To this end, as shown in Fig. 3, the scribers of the low frequency reeds point toward the butts thereof. The motion of the end masses of the reeds are, of course, recorded on the chart 24.

It can be shown mathematically that the motion of the end mass of a reed is $$\frac{d^2y}{dt^2} = p^2 x$$

where $$\frac{d^2y}{dt^2}$$

is the absolute acceleration of the reed mass, $p$ is the circular frequency, and $x$ is the maximum or peak displacement of the mass relative to the gage base. Converted to the instrument shown, the acceleration $$\frac{d^2y}{dt^2}$$

for the motion of any mass 70 or 72 can be determined from the curve drawn by the scriber of the particular mass on the chart 24. A plot of this absolute acceleration against reed frequency produces a type of shock spectrum useful to a designer of shock-resistant equipment.

The chart 24 unwinds from a spool 100 then wraps around the platen 46, passing through the space 40 in so doing, and finally wraps up on the drive roll or spool 102. Both spools are removably held on the main frame 20. To this end, as shown in Fig. 1, the lower plate section 44 has each of the holes therein provided with an upper seat which holds a bearing washer 104. Each bearing washer 104 holds a pivot 106 that has a short upwardly extending shaft that rotatably holds the associated spool.

The means for rotatably supporting the upper end of a fresh or new spool or roll 100 of the chart is shown in Fig. 2. It comprises a bolt 108 that screws through an appropriate hole in the top of the side portion 34 of the main frame 20. A lock nut 110 is also provided on the bolt below its head. The lower end of the bolt 108 comprises the bearing stub shaft 28. Stub shaft 28 fits the journaling hole in the top of the spool. A springy friction washer 112 is provided between the head of the spool and the bottom of the enlarged part of the bolt 108 for holding the spool 100 fairly firmly in position. For releasing or securing the spool the nuts are loosened or tightened in an obvious way.

The upper end of the wrap-up spool 102 is held in place by the drive shaft 30 which is rotatable in a threaded bushing 113 having thereon a lock nut 114. The threaded bushing threads into an appropriate hole in the upper part of the side portion 34 of the main frame 20. The lower end of the drive shaft 30 has a key slot for receiving a key 116 that is also received in a key slot in the spool 102. Obviously when the drive shaft 30 rotates the spool 102 also rotates and wraps the chart 24 thereabouts.

In accordance with the invention, an automatic driving means is provided for rotating shaft 30. This automatic drive may be mechanical or electrical. However an electrical form is preferred and has been indicated as driving means 26. In the embodiment shown this driving means 26 comprises a motor base plate 120 provided with holes through which the through hold-down bolts, subsequently mentioned, for the instrument can pass, thereby holding the motor base plate onto the top of the main frame 20. Fastened to the motor base plate 120, by means of a plurality of motor-securing bolt and nut means 122, is an electric motor 124 of a constant speed type. The shaft of the motor 124 drives a reducing gear box 126 having output shaft 128 to which bevel gear 130 is secured. Gear 130 meshes with bevel gear 132 held by set screw 134 on the upper end of a contracted portion 136 of shaft 30. The set screw is released and gear 132 dropped when it is desired to rotate shaft 30 by hand or to replace a spool 102. A cooling fan 138 is provided for the motor 124.

For securing the instrument to a piece of equipment, an expendable mounting plate 140 of steel is used. The steel plate 140 is trough shape with uprights 142 and 144 provided with threaded holes to receive ends of through bolt means 146 and 148.

The bolt means 146 comprises a single stud 159 that passes through holes in the top and bottom of the main frame 20, through the hollow of the central portion 36 of the main frame, and through the motor base plate 120 for holding the base plate to the main frame. The stud receives a tightening nut 149.

The through bolt means 148, however, comprises a cap nut 150 having a polygonal head 152 and an enlarged portion 154 that fits in a seat in the motor base plate 120. The body portion of the cap nut extends into an enlarged portion of the hole 41 of the side portion 32 of the main frame. The through bolt means 148 also comprises a stud 156 threaded at both ends. One end threads into the mounting plate 140 and the other end projects slightly above the main frame 20 for engagement by the cap nut 150. The bolt means 146 and 148 should be quite strong and capable of holding the mounting plate tightly to the main frame so that the two will move in unison.

In a preferred manner of use of the instrument, the expendable mounting plate 140 is securely welded to the equipment whose response to shock is to be investigated. The studs 156 and 159 are secured in the mounting plate. The sub-assembly of the motor 124, gearing 126 and base plate 120 is placed in position, and the nuts for the studs added and tightened, preferably by a torque wrench. The tension in the bolts should be great enough to prevent the slightest separation of the main frame 20 from the mounting plate 140 under the most intense shock for which the instrument is designed.

Upon shock, and upon intermittent shocks if applied, the reeds will mark the chart 24 which, if the motor 124 is energized, will be moving. The scriber on the guide means 55 will also mark a reference line on the chart.

Obviously many modifications and variations of the present invention are possible in the light of the above teachings. It is therefore to be understood that within the scope of the appended claims, the invention may be practiced otherwise than as specifically described.

What is claimed and desired to be protected by Letters Patent is:

1. An instrument of a type described comprising a main frame having a first side portion, a second side portion and a central portion, said main frame comprising a one-piece aluminum casting having a bottom and a top completely thereacross, said central portion comprising a flat platen having an edge spaced from said first side portion, said second side portion having upper and lower plate-like sections provided with means for receiving a pair of roll means for wrapping and unwrapping a recording chart with the chart passing around said edge, said first side portion having a plurality of spaced slots, a plurality of reeds of different resonant frequencies, each of said reeds having a butt, each of said reeds being in one of said slots, the butt of each reed being wider at room temperature than the associated slot, each of said reeds having a blade portion extending from its butt portion, each reed being a single piece of steel, a weighting means attached to an end of each blade portion, and a scriber attached to said weighting means.

2. An instrument as defined in claim 1 but further characterized by a drive means secured to the top of said main frame, and said drive means comprising connections for driving one of said roll means.

3. A main frame for an instrument of a type described, comprising a one piece casting having a first side portion, a second side portion and central portion, said frame having a top and bottom completely thereacross, said central portion comprising a flat platen having an edge spaced from said first side portion, said second side portion having upper and lower plate-like sections provided with means for receiving a pair of roll means for wrapping and unwrapping a recording chart, with the chart passing around said edge, said first side portion having a plurality of spaced slots.

4. A main frame for an instrument of a type described, comprising a one piece casting having a first side portion, a second side portion and central portion, said frame having a top and bottom completely thereacross, said central portion comprising a hollow platen having an edge spaced from said first side portion, said second side portion having upper and lower plate-like sections provided with means for receiving a pair of roll means for wrapping and unwrapping a recording chart, with the chart passing around said edge, said first side portion having a plurality of spaced slots on its front and back.

5. A frame as defined in claim 4 but further characterized by said main frame having a hole for a through bolt means passing through said first portion and between said slots on the front and back.

6. A frame as defined in claim 4 but further characterized by said bottom of said main frame being heavier than said top of said main frame.

References Cited in the file of this patent

UNITED STATES PATENTS

| | | |
|---|---|---|
| 636,685 | McGarvey | Nov. 7, 1899 |
| 1,519,473 | Zahm | Dec. 16, 1924 |
| 2,436,529 | Pressley | Feb. 24, 1948 |
| 2,441,162 | McPherson | May 11, 1948 |
| 2,521,918 | Hudson et al. | Sept. 12, 1950 |
| 2,616,681 | Morrow | Nov. 4, 1952 |
| 2,695,211 | Guttwein et al. | Nov. 23, 1954 |